US010904683B2

(12) United States Patent
Riedel et al.

(10) Patent No.: US 10,904,683 B2
(45) Date of Patent: Jan. 26, 2021

(54) INTERCOM NETWORK AND TERMINAL THEREFOR

(71) Applicant: Communications International GmbH, Wuppertal (DE)

(72) Inventors: Thomas Riedel, Wuppertal (DE); Christian Diehl, Wuppertal (DE)

(73) Assignee: RIEDEL COMMUNICATIONS INTERNATIONAL GMBH, Wuppertal (DE)

(*) Notice: Subject to any disclaimer, the term of this patent is extended or adjusted under 35 U.S.C. 154(b) by 0 days.

(21) Appl. No.: 14/823,523

(22) Filed: Aug. 11, 2015

(65) Prior Publication Data

US 2016/0050505 A1 Feb. 18, 2016

(30) Foreign Application Priority Data

Aug. 15, 2014 (DE) .................. 10 2014 011 963
Jan. 23, 2015 (DE) .................. 20 2015 000 424 U

(51) Int. Cl.
*H04R 27/00* (2006.01)
*H04M 9/00* (2006.01)
*H04M 1/725* (2006.01)

(52) U.S. Cl.
CPC ........ *H04R 27/00* (2013.01); *H04M 1/72513* (2013.01); *H04M 9/007* (2013.01)

(58) Field of Classification Search
CPC ........... H04M 3/5183; H04M 3/42323; H04M 3/5232; H04M 3/54; H04M 1/72513; H04M 9/007; H04M 9/001; H04M 2203/205; H04M 2203/2083; H04M 2242/04; H04M 3/42102; H04M 3/42221; H04M 3/42348; H04M 3/42365; H04M 3/5166; H04L 12/66; H04L 29/06; H04L 67/306; H04L 69/329; H04L 12/44; H04L 12/46; H04L 25/14; H04L 27/10; H04L 5/06;

(Continued)

(56) References Cited

U.S. PATENT DOCUMENTS 3,304,376 A * 2/1967 Truby .................. H04M 11/027
  379/160
3,725,601 A 4/1973 Jetzt et al.
(Continued)

FOREIGN PATENT DOCUMENTS

DE 102006033295 A1 7/2006

*Primary Examiner* — Lun-See Lao
(74) *Attorney, Agent, or Firm* — Andrew Wilford

(57) ABSTRACT

The invention relates to, among others, an intercom network (10), comprising a plurality of speech stations (11*a*, 11*b*, 11*c*) and at least one switching center (13, 16), wherein from each speech station connected to the switching center a connecting line (12*a*, 12*b*, 12*c*) extend to the switching center, wherein the connecting line provides a direct connection, respectively, between the switching center and the connected speech station, and wherein the speech stations of the intercom network, due to an audio data communication via the switching center, can enter into audio communication in real time. The particular feature consists, among others, in that at least one speech station (11*a*) comprises a terminal (53, 54) for a second connecting line (50, 50*a*, 50*b*, 50*c*), via which the speech station is connected with the same switching center (13) or with another switching center (16).

3 Claims, 6 Drawing Sheets

Figure 1:
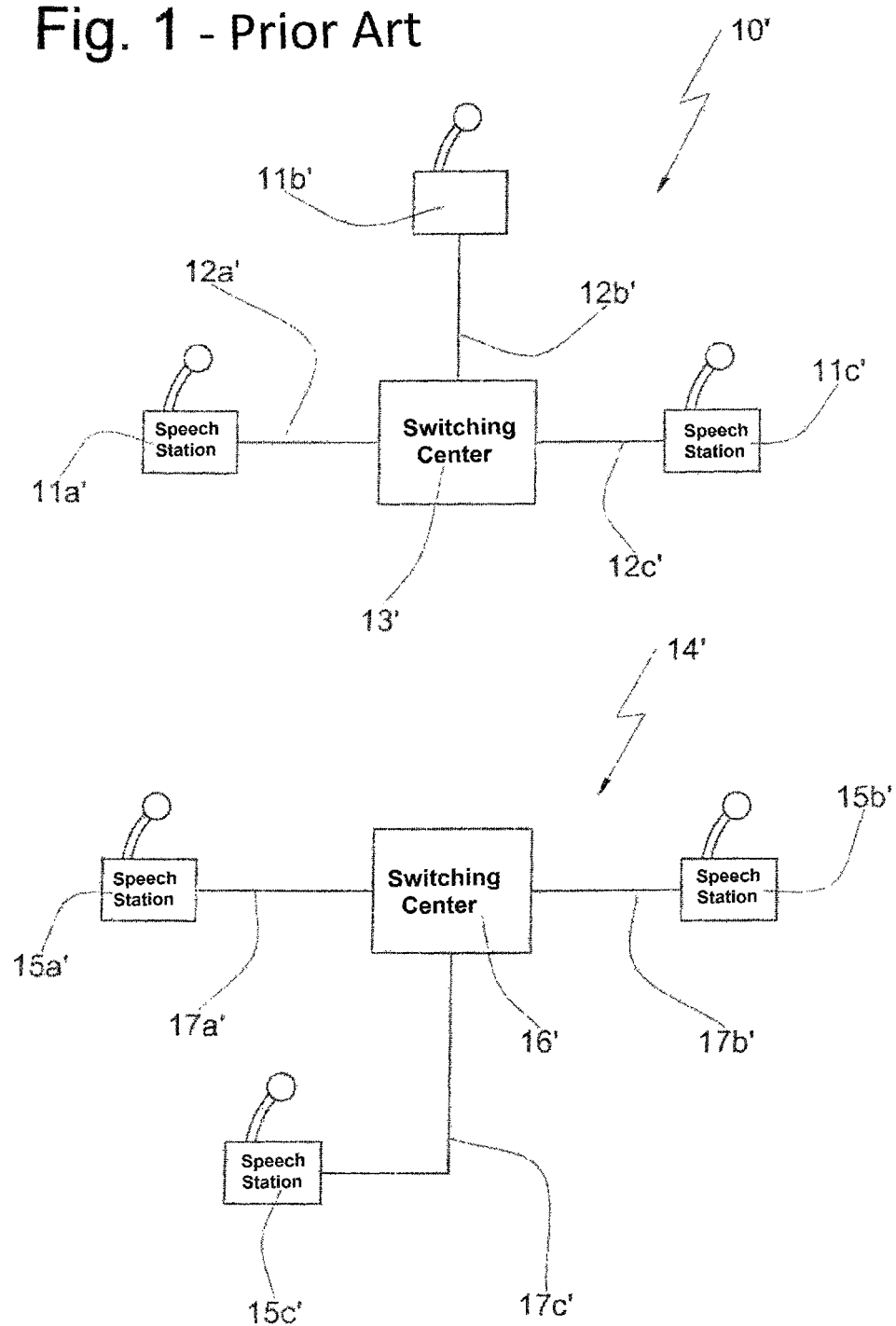

(58) Field of Classification Search
CPC ... H04B 7/2615; H04B 7/2659; H04W 72/00; H04W 76/02
USPC ............. 381/85, 1–4; 379/157, 160, 167.11, 379/265.02, 265.09, 265.12, 265.13; 455/517, 422.1
See application file for complete search history.

(56) References Cited

U.S. PATENT DOCUMENTS

| | | | |
|---|---|---|---|
| 4,769,837 A * | 9/1988 | McCormick | H04M 9/02 379/160 |
| 5,594,788 A * | 1/1997 | Lin | H04M 1/654 379/167.11 |
| 7,630,294 B2 | 12/2009 | Berndt et al. | |
| 8,311,085 B2 | 11/2012 | Albiston et al. | |
| 8,553,865 B2 * | 10/2013 | Menard | H04L 65/605 348/14.09 |
| 10,284,698 B1 * | 5/2019 | Sieben | H04M 3/56 |
| 2004/0086099 A1 * | 5/2004 | Romanski | H04Q 3/62 379/201.01 |
| 2004/0109552 A1 | 6/2004 | Beyda | |
| 2004/0146047 A1 * | 7/2004 | Turcan | H04L 29/06 370/352 |
| 2006/0048144 A1 * | 3/2006 | Willess | G06F 8/61 717/177 |
| 2008/0175230 A1 | 7/2008 | Brand et al. | |
| 2011/0206211 A1 | 8/2011 | Dahan et al. | |

* cited by examiner

Fig. 1 - Prior Art

INTERCOM NETWORK AND TERMINAL THEREFOR

The applicant has been engaged in developing, producing and marketing intercom networks and speech stations for intercom networks for more than 10 years.

A speech station in terms of the present patent application, in the interest of a consistent nomenclature also in respect of the state of the art, is an element which comprises a loudspeaker and a microphone and is configured for subscribing to an intercom network.

An intercom network is a kind of complex intercom system with numerous subscribers. Speech data and signaling data or control data are communicated via the lines of the intercom network.

Intercom networks as currently known comprise a plurality of speech stations which are connected with each other via a switching center. The connections between individual subscribers, so-called speech stations, and the switching center are each configured as a direct connection between the switching center and the connected speech station. In particular they are configured as hard-wired point-to-point connections.

For completeness' sake it is mentioned here that in addition to hard-wired point-to-point connections logical direct connections may also be provided. A logical direct connection of this kind between switching center and speech station may be created, for example, in that a joint line section extends as far as a branching point and at that point divides into two arms or branches, which lead to individual speech stations. Here, by means of network administration of this Y-shaped connecting line, a logical direct point-to-point connection is created between the individual speech station and the switching center. The switching center switches, configures and manages these connections. As such the switching center can, for example, ensure that certain speech stations can communicate directly with other certain speech stations or that a speech station, after pressing a selection key, can communicate directly with another selected speech station.

The switching center is, so-to-speak, the switching mechanism of the intercom network, which configures all connecting paths.

At the speech station a plurality of selection keys is provided. In consequence to pressing a certain selection key, both the speech signal input directly at this speech station and a signaling or control signal communicating to the switching center the information, which selection key has been pressed at this speech station, are transmitted via the point-to-point connection. The signaling or control signal may therefore comprise a selection-key identification signal.

Upon receipt and in the knowledge of this selection-key identification signal the switching center can assign the audio signal received from this speech station to a target speech station and forward this to the same.

There exists also the possibility that the audio signals input at the speech station are forwarded simultaneously to several other speech stations. Vice-versa it is possible that audio signals are simultaneously collected from several speech stations and are forwarded, superimposed, to one or more target speech stations. The typical name for the latter is "group call".

Generic intercom networks are used in broadcasting stations or television stations. In addition they are used in theaters and at events such as sports events or musical events or at any kind of event, where live reporting is employed.

State-of-the-art intercom networks are regularly configured as closed systems. A generic intercom network comprises at least one switching center and several speech stations. Another name for switching center is "matrix".

Generic state-of-the-art intercom networks are, in particular, constructed using a star-shaped network architecture. This means that all connecting lines extend in a star-shaped manner as hard-wired point-to-point lines from a switching center to individual subscribers.

It is, however, also known to configure intercom networks, which comprise two or more switching centers. Here, in particular star-shaped connecting lines extend from each switching center as hard-wired point-to-point lines to individual connected speech stations. The several switching centers are directly connected with each other. Each speech station, however, is connected to only one switching center.

Audio communication of one speech station connected to a first switching center with another speech station connected to another switching center is always realized in such a way that the audio signals are communicated via both switching centers. Such a system architecture of an intercom network, with regard to the associated administrative effort, is feasible only in certain cases of application.

A communication between speech stations of different switching centers, given the case that the switching centers assigned to the speech stations are not connected with each other, is not possible.

There exists a need, in intercom networks of the generic kind that in certain application situations, an operator of a speech station connected to a first switching center wants to enter into direct communication with an operator of a speech station connected to a second switching center.

The invention is based on the requirement to provide an intercom network which makes a communication of this kind possible.

The requirement is met according to the invention by the characteristics of claim 1.

According to the invention an intercom network is provided, where at least one speech station comprises a terminal for a second connecting line.

The first connecting line is the connecting line via which the speech station is connected with the switching center.

Via the second connecting line the speech station is connected with the same switching center or with another switching center.

Given the case that the speech station is connected with the same switching center via the first and the second connecting line, there exists the possibility, according to the invention to provide an entirely redundant intercom network. This means an increase in reliability.

In case the speech station is connected with a first switching center via the first connecting line and with a second switching center of the same intercom network or another intercom network via the second connecting line, a considerable improvement of the application situation can be achieved. For example this opens up the possibility for remote applications. On the other hand subscribers to the intercom network, i.e. operators of a speech station can work and communicate simultaneously in different intercom networks.

For example it is possible for two transmission vehicles to transmit two different football matches. A subscriber working at a speech station can be connected with switching centers in the two different transmission vehicles. Thus for example, one commentator can report on both matches in succession.

The second connecting line is preferably provided as a direct hard-wired point-to-point connection.

As explained in the beginning, the second connecting line may be provided, exactly as the first connecting line, but also as a logical direct point-to-point connection between the speech station and the one or more connected switching centers.

In particular, according to one embodiment, the invention allows different speech stations, which are connected to different switching centers, to directly communicate with each other.

The principle of the invention consists in connecting speech stations via the second connecting line, which is configured separately from the first connecting line, with one switching center. The speech station may thus be redundantly connected twice with the same switching center, or may be connected with two different switching centers.

Management and administration of the terminals of the speech stations is performed from that switching center, with which the speech station is connected via the corresponding connecting line. In particular, given the case that a speech station is connected with two switching centers, management of the terminal for the first connecting line may be effected by the first switching center, and management of the terminal for the second connecting line may be effected by the second switching center.

The second connecting line, in the same way as the first connecting line, may be any kind of line which permits the communication of audio data. The first or second connecting line may, for example, be a telephone line or an internet line, in particular using a VoIP protocol.

According to the invention the second connecting line allows a speech station to have a wide-area connection to two different switching centers. A wide-area connection is, in particular, considered to be one, where the two switching centers connected to the speech station are arranged remote from each other over great distances, in particular over distances of more than 1 km, further in particular of more than 5 km.

The invention also covers the case where status signals are communicated from the speech station to the two connected switching centers via the first and/or the second connecting line. For example, as the speech station is switched on, information may be communicated to the connected switching center, regarding the type of operating mode in which the speech station currently is or whether it is currently conducting a communication via the first connecting line or via the second connecting line.

Insofar information on a standby mode, for example, may be communicated from a speech station to the respective switching center connected to the speech station, and managed by the switching center. Such standby information may be communicated, for example, to all other operators of speech stations connected with the one or other switching center, thereby allowing all subscribers to obtain knowledge of the fact that the operator of this particular speech station is available to be approached.

The two switching centers connected to the speech station can therefore keep track of which speech stations they are currently connected to, which is their current operating mode and which is their current operator. With a variant of the invention provision may also be made for a first switching center connected with the speech station to receive information from the speech station regarding with which other switching center this speech station is connected via the second connecting line.

It is also possible, for example, to enter the name of an operator via the speech station and to forward this to the two switching centers connected with this speech station, and for the switching centers to manage this.

Covered by the invention are those intercom networks, where the connecting lines from one switching center extend to individual speech stations as direct, hard-wired point-to-point connections, which insofar, in particular, results in a star-shaped line architecture. In addition the invention also covers intercom networks, where first and second connecting lines extend from one switching center to individual speech stations.

Advantageously provision is made for the invention to make it possible for an operator of a speech station, with the aid of a display at the speech station or a display associated with the speech station, to receive information for example, as to whether a certain subscriber present at a speech station connected to a switching center is currently available.

In terms of the invention this makes it possible, for example during live events, where quick consultations with other operators of speech stations connected to another switching center, are highly desirable, for an operator of a speech station to simply and quickly consult in this way with an operator at another speech station.

The invention enables the speech station, which is connected with the first switching center, to communicate with all subscribers connected to this switching center, and at the same time to communicate via the second connecting line with all subscribers, which are connected to the second switching center.

Each speech station comprises a loudspeaker and a microphone. The microphone is used to feed audio data into the network via an operator. The loudspeaker enables the operator at the speech station to output received audio data.

According to an advantageous development of the invention each speech station comprises selection keys, wherein when a selection key is pressed by the operator, an immediate audio connection can be established via the switching center between this speech station and a speech station of the intercom network selected by pressing the selection key. The speech station therefore comprises several options in order to connect this speech station with other speech stations of this intercom network by simply pressing the selection keys.

It should be pointed out here that each speech station is always connected, via the respective connecting line, with only one switching center. A point-to-point connection, in terms of hard-wiring, or also in terms of a direct connection permits safe communication of a speech station directly with another speech station via the switching center. A speech station, insofar as permitted by the switching center, can simultaneously communicate with two or more other speech stations.

A speech station preferably comprises several selection keys similar to direct dialing buttons. The electrical lines associated with individual selection keys converge in a common line, i.e. the connecting line. Strictly speaking the several selection keys are connected in common to the terminal arranged at the subscriber, for the connecting line.

According to the invention the speech station has a first group of selection keys similar to direct dialing buttons arranged on it, which converge in a first connecting line, and a second group of selection keys similar to direct dialing buttons arranged on it, which converge in a second connecting line.

The switching center is able to recognize, via signaling data, i.e. the previously mentioned selection-key identification signal, which of the several selection keys has been pressed by the operator at the speech station, and can establish the desired interconnection.

According to an advantageous development of the invention the speech station comprises a connecting-line selection key. When the connecting-line selection key is pressed by an operator a direct audio connection can be established between the speech station and a selected speech station via the first or the second connecting line depending on which line was selected. In case the two connecting lines are connected with different switching centers, pressing the corresponding connecting-line selection key allows access to either a plurality of speech stations connected to the first switching center or a plurality of speech stations connected to the second switching center.

According to an advantageous development of the invention each speech station comprises a display on which information can be displayed, which is received by the speech station via the first connecting line and/or via the second connecting line from the respectively connected switching center. For example this may include the information, which speech stations are currently connected to the network or to the respective switching center, or which switching centers are currently connected to the speech station, or which operators are currently online or are available.

It is sufficient, however, if such a display is associated with the speech station. For example, the display may be provided by a smart phone which may be connected, albeit only temporarily, to the speech station.

Further advantageously, provision is made for each speech station to comprise a user interface, i.e. an interface which allows the input of information by the operator of the speech station for the purpose of forwarding this via the first connecting line and/or the second connecting line to the respectively connected switching center. An input of information is understood, in particular, to be a possible selection of information which has been made available by the respectively connected switching center.

According to a further advantageous development of the invention the speech station comprises a first connecting line terminal and a second connecting line terminal. The first connecting line terminal and the second connecting line terminal may be configured as physical terminals.

In case of a physical configuration of the first connecting line terminal and/or the second connecting line terminal this means that a special connector, in particular a plug connector, for example a BNC connector or another plug connector is provided here. The second plug connector terminal is configured so as to be bodily or physically separate or configured apart from the first connecting line terminal.

In case of an alternative development of the invention the connecting line terminal is configured as a logical terminal. By logical terminal is understood that a separate line path is provided within the speech station, for example a path to a management component, which permits communication of this speech station via the second connecting line with the same or with a further switching center.

With this variant of the invention a speech station is provided merely with a single corporal or physical terminal, i.e. for connecting the speech station with only one connecting line.

According to a further aspect of the invention the requirement consists in proposing a speech station which is suitable for use in an above-described intercom network.

This requirement is met according to the invention by the characteristics of claim 14.

Starting from a speech station of the generic kind, the characteristic according to the invention consists in that the speech station according to the invention, in addition to a first terminal for connection to a first switching center, comprises a second terminal for connection to a second switching center via a second connecting line or for connection to the same switching center via a second connecting line, which is independent of the first connecting line.

The second connecting line terminal arranged at the speech station may be configured as a physical, i.e. bodily present terminal, for example in terms of a plug connector or a plug or a socket. Such a bodily present terminal may be provided separately or apart from the also bodily present or physical first terminal at the speech station for connecting the speech station with the switching center via the first connecting line.

However, the invention also covers the alternative of a second connecting line terminal being present in the speech station according to the invention, which is configured as a logical terminal. This logical terminal may be provided due to internal circuitry or wiring present inside the speech station. The logical terminal may comprise a physical connection, i.e. a cable connection or circuit-based connection, to the bodily present second connecting line between the speech station and the second switching center.

In other respects, as regards the advantages of individual features, and in order to avoid repetitions, reference should be made to the above-mentioned remarks regarding an intercom network according to the invention.

It should be noted at this point that the selection keys, as known from the state of the art, can be configured to be programmable. With other variants of the invention the key pads of the selection keys can be labeled.

According to an advantageous development of the invention the speech station has a display associated with it. Further advantageously such a display is arranged at the speech station.

The display may for example be provided by a separate device connected only temporarily with the speech station. The information shown on the display may be information received by the speech station via the second connecting line.

The displayed information may for example include information regarding a notification, which speech stations are connected with the network or which speech stations are ready to communicate.

According to a further advantageous development of the invention provision may be made for the speech station to have a display associated with it, on which information can be displayed, which the speech station receives via the first connecting line and/or via the second connecting line.

According to a further advantageous development of the invention the speech station has a user interface associated with it. This can be used by an operator for the input of information. This information may for example refer to the communication via the second connecting line. For example, a name of an operator may be entered at the speech station. The name entered may then be communicated to other speech stations via the second connecting line. In this way operators of other speech stations know that a certain operator of this interface is currently connected and is ready to communicate, for example.

Advantageously the speech station comprises such a user interface directly. In this case the user interface is arranged at the speech station. The user interface may for example permit the entry of a number code. But the user interface may also be an alphanumeric user interface, a touch screen or similar.

According to a further advantageous development of the invention provision is made for the speech station to be associated with a user interface, in particular for the user interface to comprise a user interface which permits the input of information by an operator, in particular the input of information of a selection of available information by an operator, for example for the purpose of communicating the information via the first connecting line and/or via the second connecting line.

According to a further advantageous development of the invention the speech station comprises an indicator which can signal to the operator of the speech station the current operating mode of the speech station. For example, the indicator can indicate to the operator that the operator is currently in communication with a further speech station via the first connecting line or via the second connecting line or is currently in standby mode for communication with a network organized by a first switching center or with a network organized by a second switching center.

According to a further advantageous development of the invention provision is made for the speech station to comprise an indicator, which indicates, as an operating mode, to an operator of the speech station that this speech station is in communication or ready to communicate with, a further speech station via the first connecting line and/or via the second connecting line.

Figure 2:
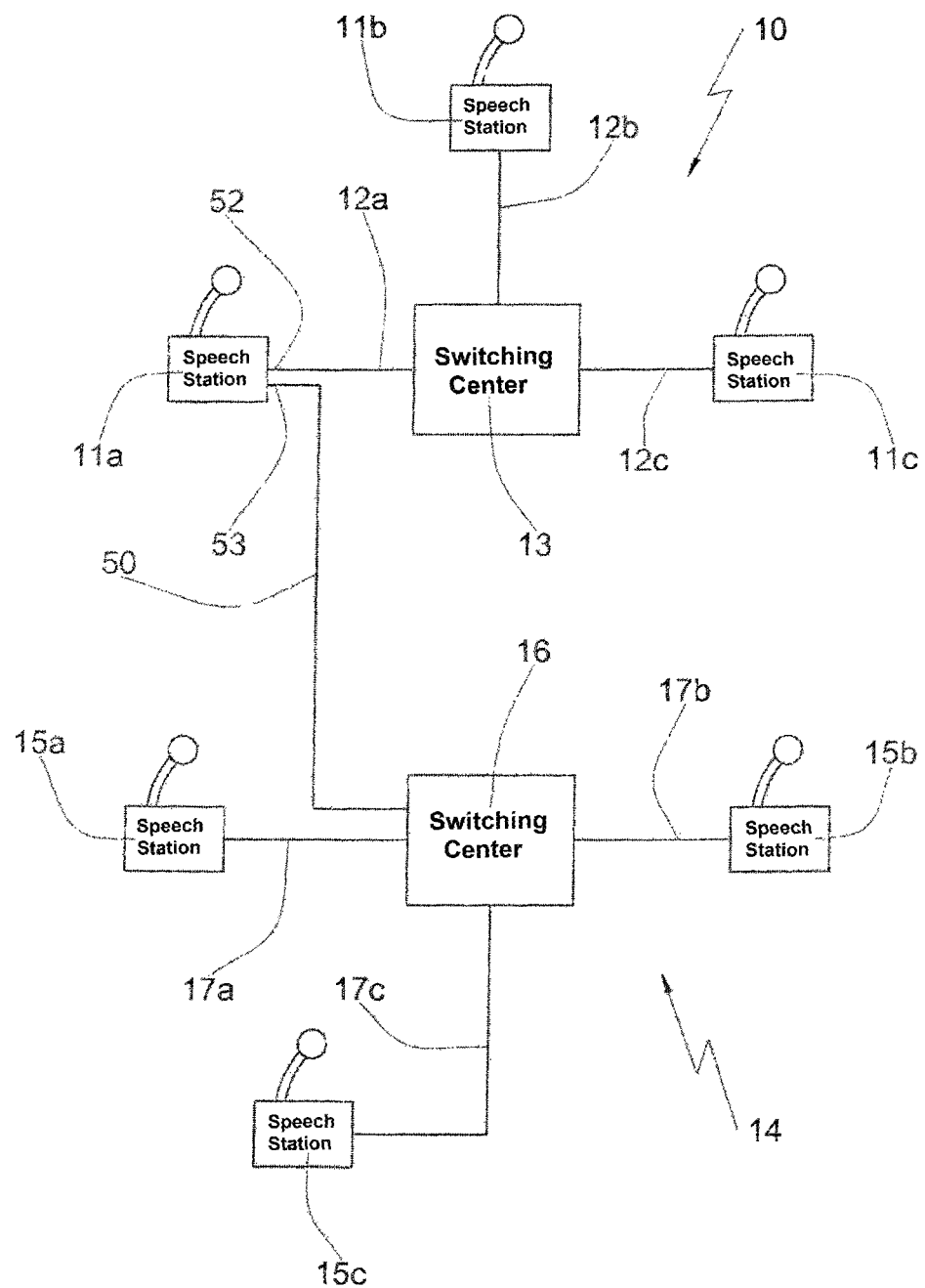
Figure 3:
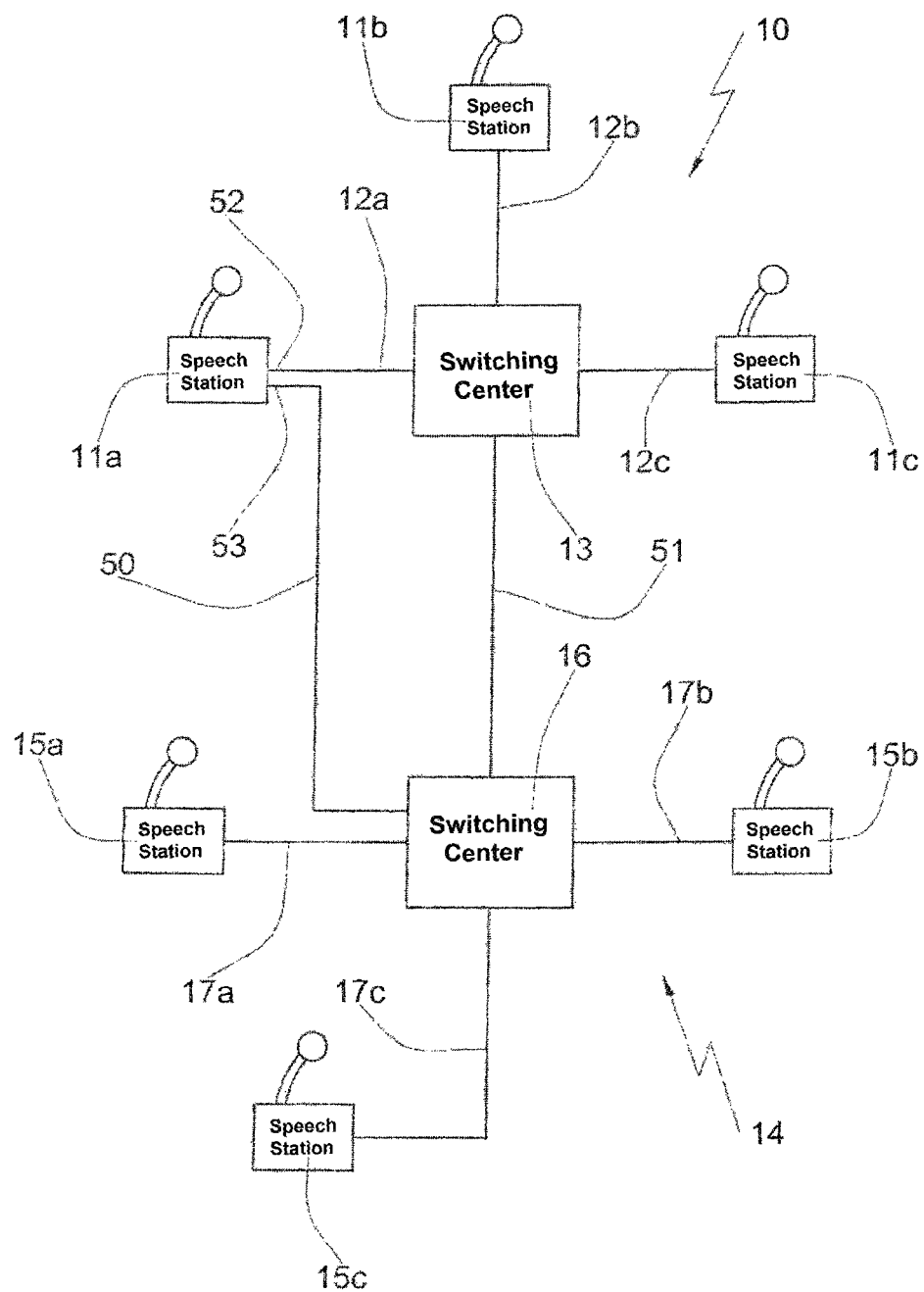
Figure 4:
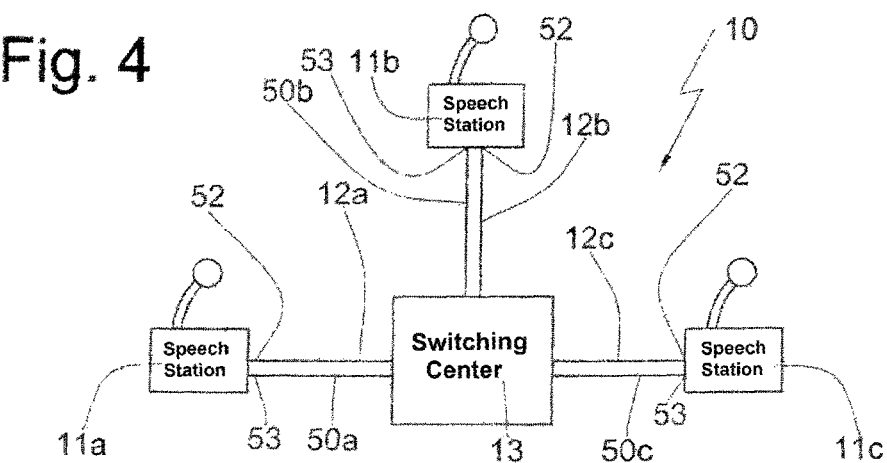
Figure 5:
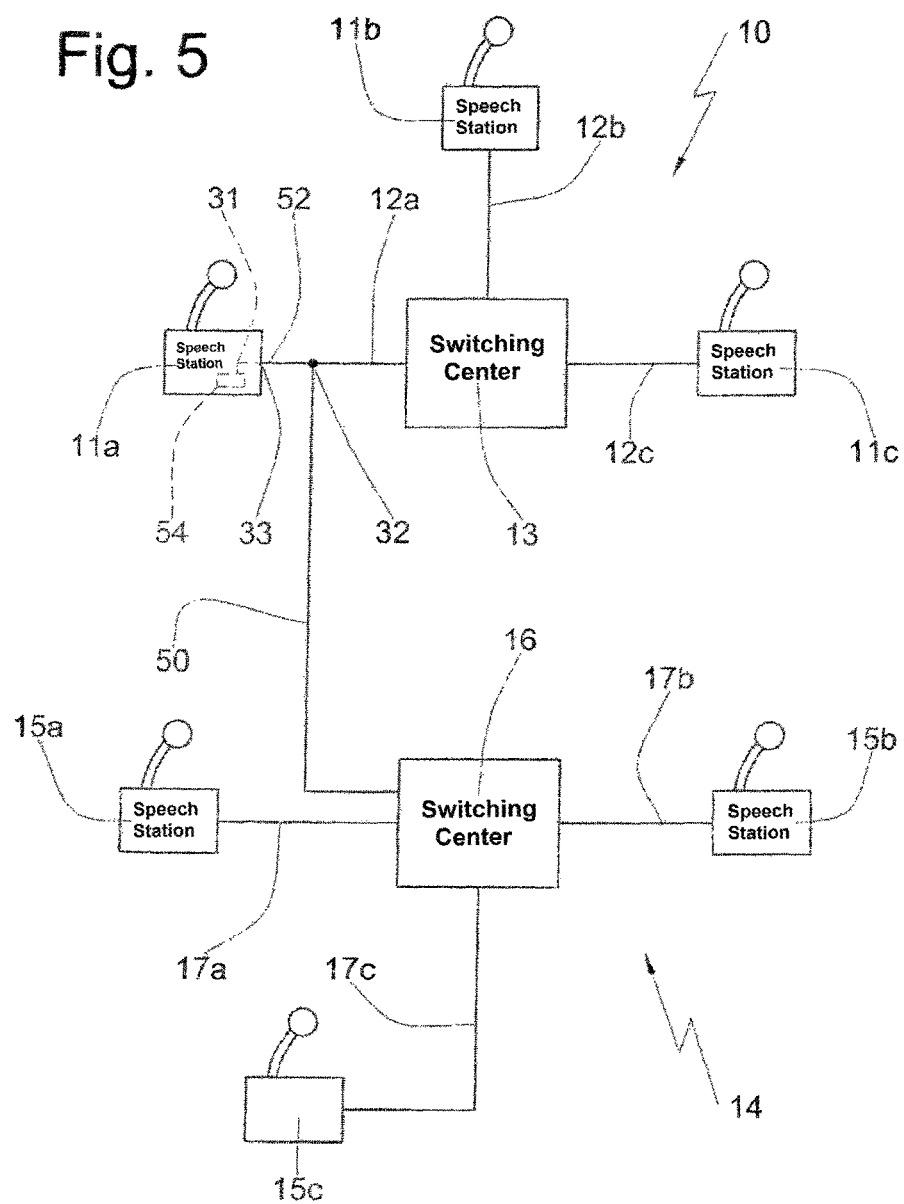
Figure 6:
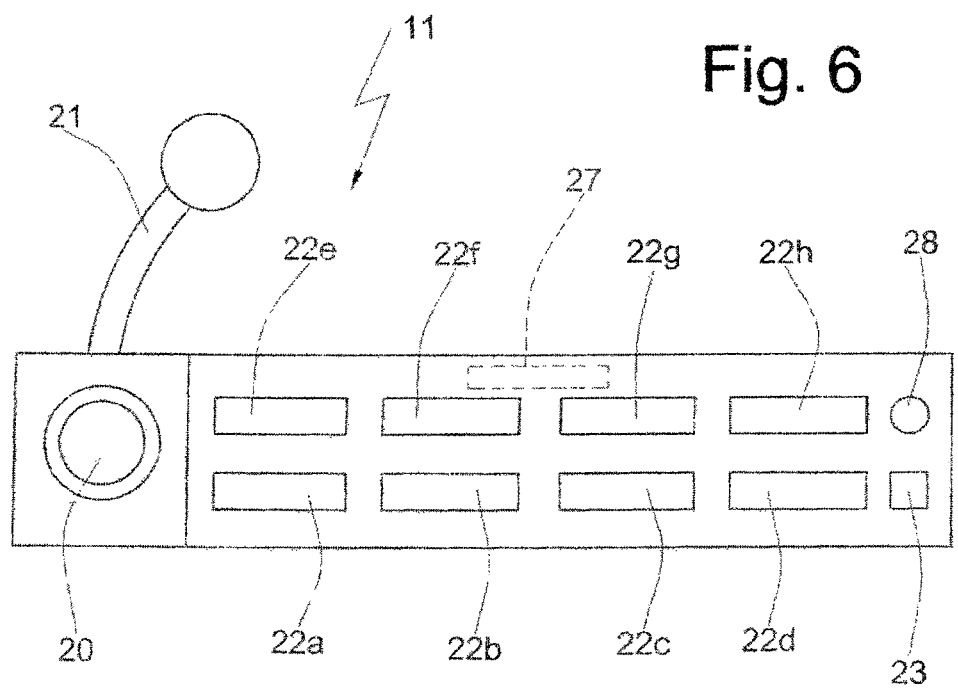
Figure 7:
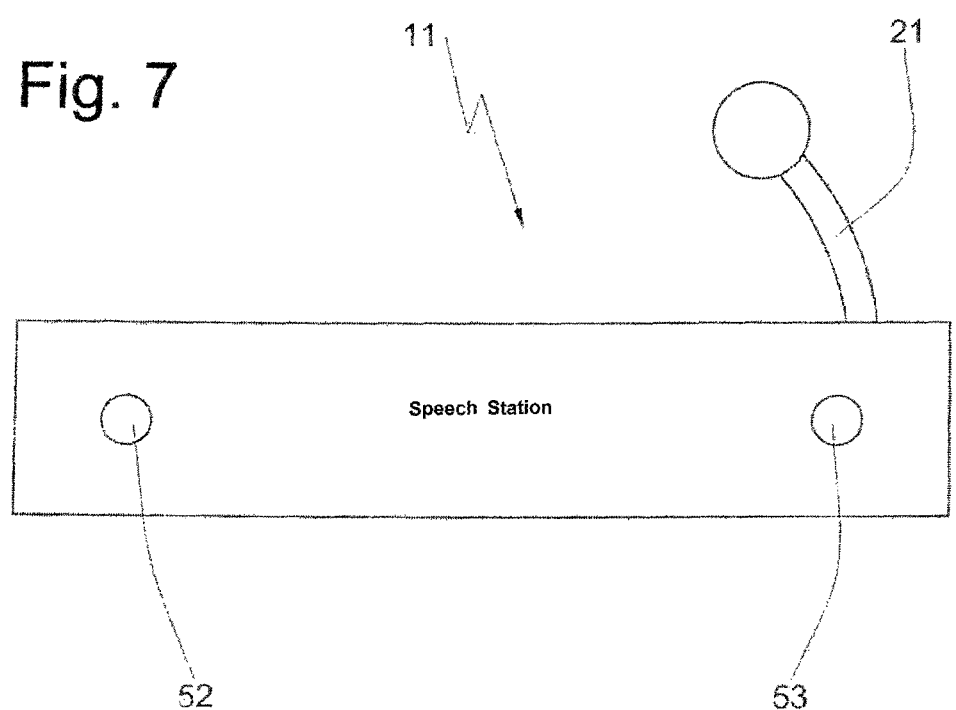
Figure 8:
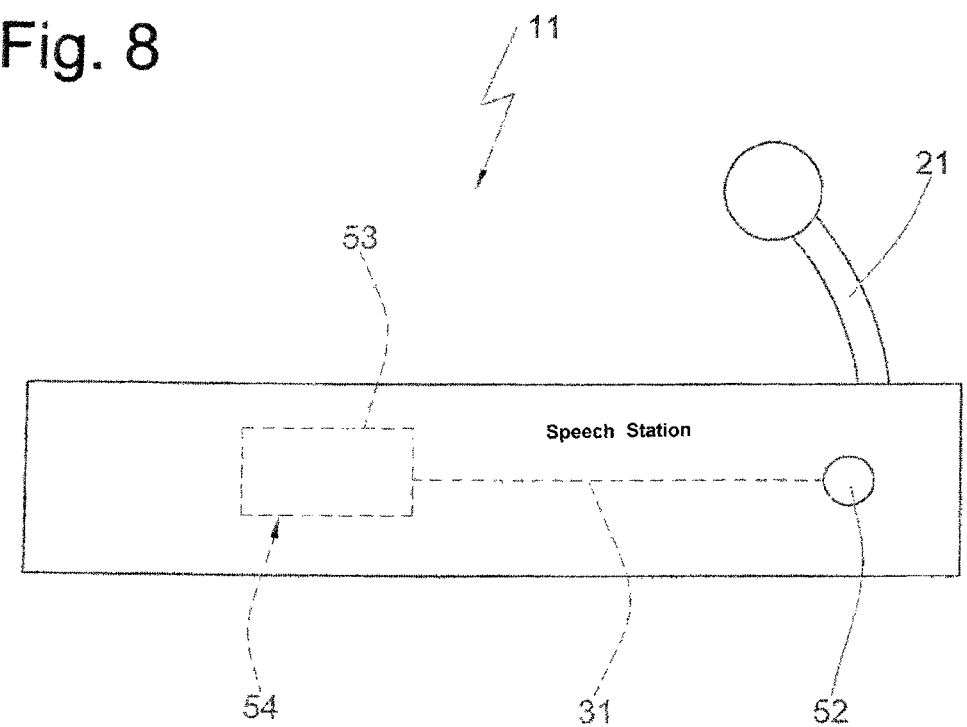
Figure 9:
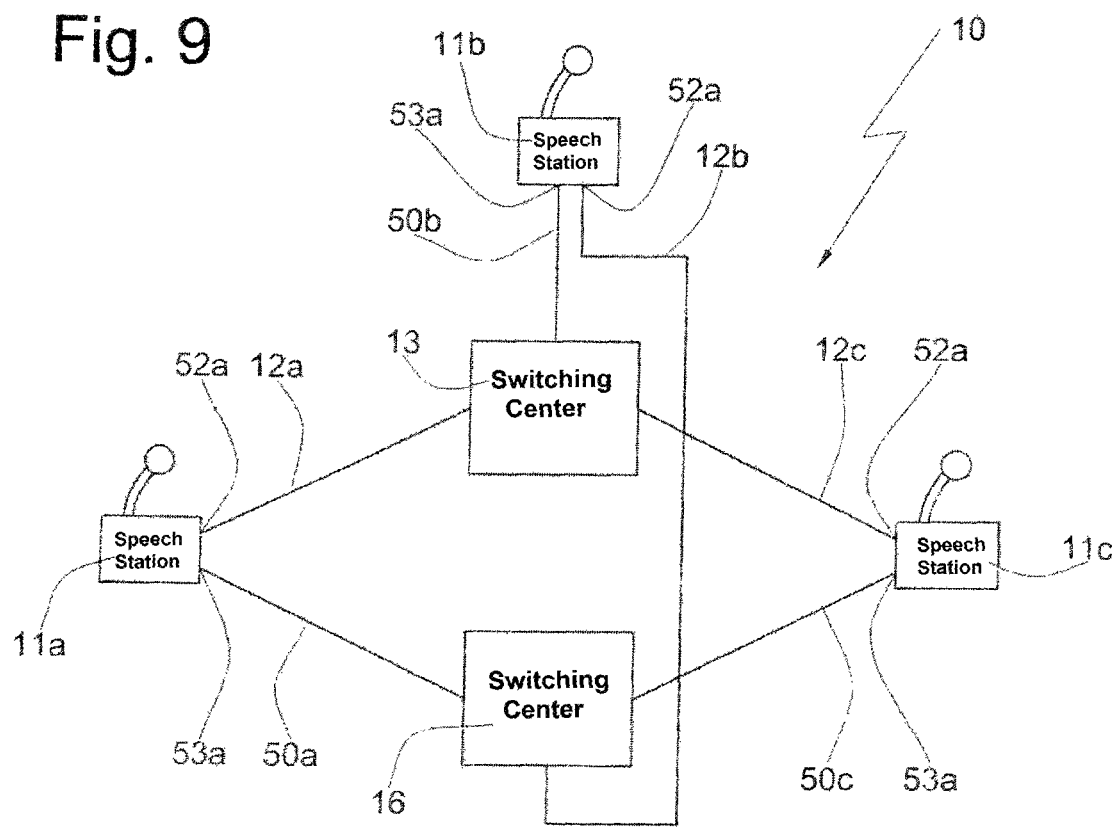

Further advantages of the invention are revealed in the sub-claims not cited as well as in the below description of exemplary embodiments illustrated in the figures, in which FIG. 1 shows a schematic block-diagram-type view of a first intercom network and a second state-of-the-art intercom network, FIG. 2 shows a first exemplary embodiment comparable to FIG. 1, of an intercom network according to the invention, wherein a speech station is connected with a first switching center via a first connecting line and with a second switching center via a second connecting line, FIG. 3, in a representation according to FIG. 2, shows a further exemplary embodiment of an intercom network according to the invention, where the two switching centers are also directly connected with each other, FIG. 4 shows a further exemplary embodiment of an intercom network according to the invention in a representation according to FIG. 2, wherein the speech stations connected to the first switching center are each connected via the first connecting line and via the second connecting line with the same switching center for providing a redundant intercom network, FIG. 5 shows a further exemplary embodiment of an intercom network according to the invention similar to the exemplary embodiment of FIG. 2, wherein here, in contrast to FIG. 2, no physical first connecting line terminal and a second physical connecting line terminal apart therefrom are provided, but where the second connecting line terminal is configured as a logical terminal, FIG. 6 shows, in a schematic front view, a first exemplary embodiment of a speech station according to the invention, FIG. 7 shows a rear view of the speech station in FIG. 6 schematically drawn with two separate physical terminals, i.e. a first connecting line terminal and second connecting line terminal configured apart therefrom, both of them configured as physical terminals, FIG. 8 a further exemplary embodiment of a speech station according to the invention in a representation according to FIG. 7, wherein here the second connecting line terminal is configured as a logical terminal, and FIG. 9 shows a further exemplary embodiment of an intercom network according to the invention in a representation according to FIG. 4, wherein this intercom network is configured so as to be fully redundant.

Exemplary embodiments are described by way of example in the figure description below, also with reference to the figures. For clarity's sake, including insofar as different exemplary embodiments are concerned, identical or comparable parts or elements or areas have been marked with the same reference symbols, partially with the addition of small letters.

Features which have been described with reference to only one exemplary embodiment, may, in terms of the invention, be provided also in any other embodiment of the invention. Exemplary embodiments altered in this way, even although not depicted in the drawings, are also covered by the invention.

All disclosed features are, seen on their own, essential to the invention. The disclosure of the application hereby covers, in full, the disclosure content of the associated priority documents (copy of the prior application) as well as that of the cited publications of the state of the art, also for the purpose of including individual or several features of these documents in one or in several claims of the present invention.

As regards the illustration of a state-of-the-art intercom network according to FIG. 1, the parts or elements also present in exemplary embodiments of the invention are marked there with an additional apostrophe.

Initially, an intercom network 10' according to the state of the art is explained with reference to FIG. 1.

FIG. 1 shows a first intercom network 10' according to the state of the art, and a second intercom network 14' according to the state of the art.

The first intercom network 10' comprises a switching center 13', which is shown, by way of example, to have three subscribers in the form of speech stations 11a', 11b' and 11c' connected to it. Each of the speech stations is connected to the switching center 13' via a first connecting line 12a', 12b', 12c', based on a star-shaped network architecture.

The switching center 13', so to speak, represents a center of this intercom network 10'.

The connection between respective speech stations 11a', 11b' and 11c' and the switching center 13', in this exemplary embodiment, is realized with the aid of an, in particular, hard-wired point-to-point connection. This ensures high operational safety.

Configuration and switching of these point-to-point connections is performed in the switching center 13'.

Each of the speech stations 11a', 11b' and 11c' comprises a microphone and a loudspeaker.

Besides provision is made at each speech station for several selection keys, which allow an operator of the respective speech station to establish an audio connection directly with another speech station. The first intercom network is marked with 10'.

Moreover FIG. 1 shows a second intercom network marked with 14'.

This network again comprises a switching center 16' and, shown by way of example, three speech stations 15a', 15b', 15c', which in turn are connected with the switching center 16' via in particular hard-wired point-to-point connecting lines 17a', 17b', 17c'.

It could for example be imagined that the first intercom network 10' is associated with a first broadcasting station and the second intercom network 14' is associated with a second broadcasting station.

There is no way in which these two different intercom networks 10', 14' of the state of the art, can communicate with each other. In particular, a user of a speech station, for example speech station 11a' of the first intercom network 10', cannot establish a connection with a speech station of the second intercom network 14'.

It shall now be explained by way of the first exemplary embodiment of the invention according to FIG. 2, how a speech station 11a is connected via a first connecting line 12a with a first switching center 13 of a first intercom network 10, and via a second connecting line 50 with a second switching center 16 of a second intercom network 14.

The speech station 11a according to the invention may be part, both of the first intercom network 10 managed by the first switching center 13 and part of the second intercom network 14 managed by the second switching center 16.

The speech station 11a can thus communicate, via the first connecting line 12a, with all subscribers 11b and 11c connected to the first switching center 13, and can communicate, via the second connecting line 50, with all subscribers 15a, 15b, 15c connected to the second switching center 16.

According to FIG. 2 the intercom network 10 according to the invention comprises a first speech station 11a, a second speech station 11b and a third speech station 11c. The number of speech stations is arbitrary and depends on the type and use of the respective intercom network 10.

The speech stations are respectively connected, via first connecting lines 12a, 12b, 12c, with the switching center 13 of the first intercom network 10.

Again, the point-to-point connections are hard-wired connections, which ensure high operational safety. Respective management and switching is carried out in the switching center 13. Also, some configuration is carried out in the switching center 13, which for example determines, which of the individual speech stations 11a, 11b, 11c connected to the switching center 13 can at all establish a communication with which one or ones of the one or more remaining speech stations 11a, 11b, 11c.

The second intercom network 14 of the exemplary embodiment of the invention according to FIG. 2 comprises a switching center 16, with which speech stations 15a, 15b, 15c are connected via the connecting lines 17a, 17b, 17c.

Each of the speech stations shown in FIG. 2 by way of example may be provided by a speech station to be described later in more detail with reference to FIGS. 6 to 8.

The speech station 11a of the first intercom network 10, in contrast to the speech station 11a' according to the state of the art of FIG. 1, comprises a first connecting line terminal 52 and additionally a second connecting line terminal 53.

Via the first connecting line terminal 52 the speech station 11a can be connected via the first connecting line 12a with the switching center 13. Via the second connecting line terminal 53 the speech station 11a can be connected via the second connecting line 50 with the second switching center 16.

The first connecting line 12a and the second connecting line 50 are both realized as a point-to-point connection permitting direct communication.

Based on this network architecture the user of the speech station 11a of the intercom network 10 is able to get into direct contact with the operator of a speech station of both intercom networks 10 and 14, even during operation of the intercom network 10. On the other hand, insofar as allowed by the respective switching center 13, 16, each subscriber to both intercom networks 10, 14 is able to enter into communication with the subscriber of the speech station 11a.

Assuming that for example the first intercom network 10 is associated with a first broadcasting station and is used to accompany, for example, a football match in terms of a live transmission, and assuming that the second intercom network 14 is used, for example at the same point in time, by another broadcasting station, in order to accompany another sports event, the following situation may arise:

The user of the speech station 11a may for example be in need of requesting information about a certain image setting option. Further he may have information that a user of the speech station 15c of the second intercom network 14 is approachable at this point in time and is able to divulge this information.

The user is now able to directly access the speech station 15c via the second connecting line 50 and the second switching center 16, in order to establish a direct audio communication with this speech station 15c. In this way, due to the operator of the speech station 11a being able to talk to the operator of the speech station 15c, the missing information can be quickly communicated.

On the one hand the audio data communicated from a first speech station 11a to another speech station 15c includes pure speech information.

On the other hand signaling or control data may be communicated which allows the switching mechanism to identify the selected selection keys in terms of a target button.

In addition control data may also be communicated via the first connecting lines 12 or via the second connecting lines 50, and this control data may for example represent a switch-on or switch-off command for a lamp or another electrical device.

A further exemplary embodiment of the invention is explained with reference to FIG. 3. This is different from the exemplary embodiment shown in FIG. 2 only in that the two switching centers 13, 16 are directly connected with each other via a switching center connecting line 51. This embodiment takes into consideration that intercom networks 10 of the inventive kind can also be developed in such a way that several switching centers 13, 16 are provided and are directly connected with each other.

A further exemplary embodiment of an intercom network 10 according to the invention is shown in FIG. 4. Here only one switching center 13 is provided which for example has three speech stations 11a, 11b, 11c connected to it.

Each speech station 11a, 11b, 11c is connected with the switching center 13 via a first connecting line 12a, 12b, 12c.

Each of the three speech stations 11a, 11b, 11c is, however, also additionally connected via a second physical terminal 53 and a second connecting line 50a, 50b, 50c with the same switching center 13.

In this way it is possible to provide a redundantly configured intercom network 10.

Finally FIG. 5 shows a further exemplary embodiment of an intercom network 10 according to the invention. Here, in contrast to the previous exemplary embodiments, provision is made, not for two separate physical terminals 52, 53, as shown in FIG. 4, but here the second physical terminal 53 is configured as a logical second terminal 54 for connecting the respective speech station 11a with the second connecting line 50.

According to FIG. 5 the invention also covers the case, where the terminal 53 for connecting to the second connecting line 50a is configured as a logical terminal 54, which is connected, via an internal line 31 or a corresponding switching path via a so-called logical terminal point 33, with the connecting line 12a.

The second connecting line 50 branches off from the connecting line 12a in the area of a branch-off point 32. The branch-off point 32 represents a line split and can be arranged at any suitable point between the speech station 11a and the first switching center 13.

The expert, however, will realize that an appropriate switching-technical connection can be provided also at any other speech stations (e.g. speech station 11c or speech station 15c) of this embodiment or other embodiments.

Exemplary embodiments of speech stations configured in accordance with the invention will now be explained, and these can be employed in an intercom network 10, 14 according to the invention. Then follows an explanation of how information is communicated from the server to the operators of individual interfaces.

Referring to FIG. 6 an exemplary embodiment of a speech station 11 according to the invention is constructed in an essentially conventional manner. The speech station 11 is shown in a front view.

The loudspeaker 20 and a microphone 21 are shown on the left-hand side.

The speech station 11 comprises, in a manner known as such, a plurality of selection keys 22a, 22b, 22c, 22d, 22e, 22f, 22g, 22h, the exact number of which is arbitrary. By means of these selection keys the operator of the speech station 11 can, by actuating a certain selection key, establish a direct speak/listen connection to another speech station. This connection is established via the in particular hard-wired point-to-point connecting lines 12a, 12b, 12c, 12d, 17a, 17b, 17c, 17d, 50, 50a, 50b, 50c and the corresponding switching center 13, 16.

Each speech station can establish a direct intercom connection with another selected speech station. Group calls are also possible, for example, a speech station can establish a simultaneous intercom connection with a plurality of other speech stations.

The speech station 11 according to FIG. 6 of the invention, in contrast to state-of-the-art speech stations, additionally comprises a selection key 23, which enables the speech station 11 to gain direct access to the speech station of another intercom network 14.

The selection key 23 can be used to select either of the two switching centers 13, 16. Alternatively it may be used to select one of the two connecting lines 12a, 50.

The selection key 23 has been depicted merely as an example.

It is left to the expert to find a concrete solution for this.

In other embodiments of the invention the respective speech station is not provided with such a selection key. Here internal circuitry is used to directly establish a connection with the corresponding counterpart upon pressing one or more selection keys such as selection keys 22a, 22b, 22c, 22d, 22e, without the need to select a switching center 13, 16 or a connecting line 12a, 50.

In addition the speech station 11 in FIG. 6 comprises an optional indicator 27, which signals to the operator of this speech station 11 that the speech station is in a certain operating mode, e.g. in one of several possible operating modes. For example the indicator may signal to the operator that the speech station is currently in a first operating mode, in which it communicates via the switching center 13, or that it is in a second operating mode, in which it communicates via the switching center 16.

The schematically shown indicator 27 may also be configured as a touchscreen and insofar, represents a user interface or an access 28, which offers the option as to whether a communication shall be established with a first switching center 13 or a second switching center 16, or whether a communication shall take place with other speech stations via a first connecting line 12 or a second connecting line 50.

In FIG. 6, the element marked with 28 may also be configured additionally and/or alternatively as a user interface or interface or as access 28.

The invention also covers the case where a first group of selection keys (e.g. selection keys 22a, 22b, 22c, 22d) permits communication of this speech station via the first connecting line 12, and a second group of selection keys (22e, 22f, 22g, 22h) permits communication of this speech station with other speech stations via the second connecting line 50.

Alternatively or simultaneously the operator of this speech station may be notified via the indicator 27, with which intercom network 10, 14 the speech station 11 is currently communicating, or which subscribers are currently accessible from this speech station.

FIG. 7 shows in a schematic rear view that the speech station 11 according to the invention comprises a first terminal 52 for connection with the first switching center 13 via the first connecting line 12, and a second terminal 53 for connection with the second switching center 16 via the second connecting line 50. With this embodiment the first connecting line terminal 52 and the second connecting line terminal 53 are configured as physical terminals separate from each other. They may for example be plug connectors.

By contrast the further exemplary embodiment of an interface 11 in a rear view as per FIG. 8 only shows a first physical terminal 52 for connection with the first connecting line, wherein the second terminal 53 for connection with the second connecting line is configured as a logical terminal 54 and is connected, analogously to the diagram of the embodiment in FIG. 5, via an internal line 31 with the first connecting line terminal 52.

It should be noted that the number of speech stations and the number of switching centers, which can be connected to one speech station or the number of connecting line terminals, which can be provided at one speech station, can be selected freely at random in all embodiments.

FIG. 9 shows a still further exemplary embodiment of an intercom network 10 according to the invention, which is configured to be entirely redundant. The layout and architecture of this intercom network 10 according to the invention is comparable to the layout of the embodiment of FIG. 4. The difference compared to FIG. 4 consists in that here the intercom network comprises two switching centers 13, 16. One of the two switching centers, for example switching center 13, normally operates on its own. It is only if the switching center 13 fails, that the second switching center 16 takes over. To this end the two switching centers 13, 16 are configured so as to be identical, so-to-speak mirrored, as the expert would say.

Each of the speech stations 11a, 11b, 11c is connected via the associated first connecting line 12a, 12b, 12c with the first switching center 13. At the same time, each of the speech station 11a, 11b, 11c is connected via a second connecting line 50a, 50b, 50c with the second switching center 16, provided as a redundant switching center.

Given the case that the switching center 13 fails during operation of the network, for example during a live event, the second switching center 16 can immediately take over the work and function of the failed first switching center 13 without the operator or the user of speech stations 11a, 11b, 11c noticing or having to notice anything, and keep the operation of the intercom network going.

The two identically configured switching centers 13, 16 may be connected with each other, something which is not shown in FIG. 9. Such a connection may, for example, include constantly checking the functions of the first switching center 13, and/or permit the transmission of a fault signal or an initialization signal which commands the second switching center 16 to immediately switch on and take over operation, if the first switching center 13 fails.

In other respects the embodiment shown in FIG. 9 corresponds to the above description of the remaining embodiments, therefore in order to avoid repetition reference should be made to the above passages.

With the embodiment shown in FIG. 9 provision may also be made, for example, for the two switching centers 13, 16 to take over operation in turn regularly, without a failure having been diagnosed. For example, provision may be made that at regular time intervals, say every 60 seconds for example, one of the two switching centers 13, 16 takes over from the other switching center 16, 13, thereby ensuring alternate operation.

The deciding factor is, however, that the intercom network 10 according to FIG. 9 allows for alternate operation, so that an intact, mirrored switching center 16, with the aid of a plurality of second connecting lines 50a, 50b, 50c is able to fully take over operation in case of a fault or failure of the first switching center 13.

Each of the speech stations 11a, 11b, 11c comprises, as is evident from FIG. 9, a terminal 52a, 52b, 52c for connection with the first connecting line 12a, 12b, 12c, and a second terminal 53a, 53b, 53c for connection with the second connecting line 50a, 50b, 50c.

As a matter of form it should be added that again two separate physical terminals or two separate terminals 52, 53 may be used, where the second terminal 53 may be alternatively configured as a logical terminal 54, which however is not shown in FIG. 9.

The invention claimed is:

1. In combination with a first intercom network having a first switching center that administrates, configures and switches connections between a first plurality of speech stations connected to the first switching center and a second intercom network having a second switching center that administrates, configures and switches connections between a second plurality of speech stations connected to the second switching center, a speech station belonging to the first plurality and comprising:
   a housing;
   a microphone directly mounted on the housing;
   a speaker directly mounted on the housing;
   a first connection line connected to the first switching center and transmitting audio information between the speech station and the first switching center;
   a second connection line separate from the first connection line, connected to the second switching center, and transmitting audio information between the speech station and the second switching center;
   a plurality of selection keys actuatable to directly address another speech station of the first plurality for direct audio communication therewith via the first switching center or to directly address another speech station of the second plurality for direct audio communications therewith via the second switching center;
   a first connection line terminal for connecting the first connection line to the speech station; and
   a second connection line terminal for connecting the second connecting line to the speech station.

2. In combination with a first intercom network having a first switching center that administrates, configures and switches connections between a first plurality of speech stations connected to the first switching center and a second intercom network having a second switching center that administrates, configures and switches connections between a second plurality of speech stations connected to the second switching center, a speech station belonging to the first plurality and comprising:
   a housing;
   a microphone directly mounted on the housing;
   a speaker directly mounted on the housing;
   a first connection line connected to the first switching center and transmitting audio information between the speech station and the first switching center;
   a second connection line separate from the first connection line, connected to the second switching center, and transmitting audio information between the speech station and the second switching center;
   a plurality of selection keys actuatable to directly address another speech station of the first network for direct audio communication therewith via the first switching center;
   a first connecting line terminal for connection via the first connection line with the first switching center;
   a second connecting line terminal for connecting the speech station via the second connection line with the first switching center or with the second switching center to the second intercom network; and
   a user interface for receiving information from an operator and including a name of the operator and communicating the received information via the first connection line or via the second connection line.

3. In combination with a first intercom network having a first switching center and a second intercom network having a second switching center, a speech station comprising:
   a housing;
   a microphone directly mounted on the housing;
   a speaker directly mounted on the housing;
   a first connection line connected to the first switching center and configured for transmitting audio information between the speech station and the first switching center;
   a second connection line connected to the second switching center, separate form the first connection line, and configured for transmitting audio information between the speech station and the second switching center;
   a plurality of selection keys actuatable to directly address another speech station of the first network for direct audio communication therewith via the first switching center;
   a first connecting line terminal for connection via the first connection line with the first switching center;
   a second connecting line terminal for connecting the speech station via the second connection line with the first switching center or with the second switching center to the second intercom network; and
   a display showing whether an operator of another speech station of the respective switching center is available.

* * * * *